(12) United States Patent
Goyal et al.

(10) Patent No.: US 12,341,590 B2
(45) Date of Patent: Jun. 24, 2025

(54) CHANNEL STATE INFORMATION REPORTING PRIORITY FOR LOWER-LAYER TRIGGERED MOBILITY

(71) Applicant: Nokia Technologies Oy, Espoo (FI)

(72) Inventors: Sanjay Goyal, Murray Hill, NJ (US); Timo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/935,080

(22) Filed: Nov. 1, 2024

(65) Prior Publication Data

US 2025/0175228 A1     May 29, 2025

Related U.S. Application Data

(60) Provisional application No. 63/602,487, filed on Nov. 24, 2023.

(51) Int. Cl.
*H04W 24/10* (2009.01)
*H04B 7/06* (2006.01)

(52) U.S. Cl.
CPC .......... *H04B 7/0626* (2013.01); *H04W 24/10* (2013.01)

(58) Field of Classification Search
CPC .............................. H04B 7/0626; H04W 24/10
See application file for complete search history.

(56) References Cited

U.S. PATENT DOCUMENTS

2022/0014957 A1   1/2022  Guo
2024/0313837 A1*  9/2024  Bai ...................... H04L 5/0048

OTHER PUBLICATIONS

"3rd Generation Partnership Project; Technical Specification Group Radio Access Network; NR; Physical layer procedures for data (Release 18)", 3GPP TS 38.214, V18.0.0, Sep. 2023, pp. 1-278.
"Clarification of serving cell index in CSI priority calculation", 3GPP TSG RAN WG1 #115, R1-2311671, Agenda: 7.1, Apple, Nov. 13-17, 2023, 2 pages.
U.S. Appl. No. 63/585,413, "Channel State Information Reporting Priority for Layer Triggered Mobility", filed Sep. 26, 2023, pp. 1-35.
"FL summary 4 on L1 enhancements for inter-cell beam management", 3GPP TSG RAN WG1 Meeting #114, R1-2308592, Agenda: 9.10.1, Fujitsu, Aug. 21-25, 2023, pp. 1-152.
"IEEE 802", Wikipedia, Retrieved on Sep. 23, 2024, Webpage available at : https://en.wikipedia.org/wiki/IEEE_802.

(Continued)

*Primary Examiner* — Chuong A Ngo
(74) *Attorney, Agent, or Firm* — Nokia Technologies Oy

(57) ABSTRACT

A method is provided that includes determining that at least two channel state information (CSI) reports are to be reported. The method includes calculating priority values associated with the at least two CSI reports, at least one of the priority values calculated based on a determination that at least one of the at least two CSI reports is a lower-layered triggered mobility (LTM) CSI report. The method includes determining that a time occupancy of physical channels scheduled to carry the at least two CSI reports at least partially overlap on a carrier, the at least two CSI reports thereby said to collide. And the method includes sending one or more of the at least two CSI reports that are said to collide based on the priority values.

24 Claims, 7 Drawing Sheets

(56) References Cited

OTHER PUBLICATIONS

International Search Report and Written Opinion received for corresponding Patent Cooperation Treaty Application No. PCT/IB2024/060829, dated Jan. 24, 2025, 16 pages.
"Remaining Issues on Layer-1 Enhancements for L1/L2-triggered Mobility", 3GPP TSG RAN WG1 #115, R1-2311889, Agenda: 8.7.1, Nokia, Nov. 13-17, 2023, 14 pages.
"Discussion on L1 enhancements for L1/L2 mobility", 3GPP TSG RAN WG1 #114, R1-2306767, Agenda: 9.10.1, vivo, Aug. 21-25, 2023, 12 pages.
"Maintenance of L1 enhancements for inter-cell beam management", 3GPP TSG-RAN WG1 Meeting #115, R1-2310848, Agenda: 8.7.1, Huawei, Nov. 13-17, 2023, 19 pages.
"Remaining Issues for L1/L2-triggered Mobility", 3GPP TSG RAN WG1 #116, R1-2400646, Agenda: 8.5, Nokia, Feb. 26-Mar. 1, 2024, 18 pages.
"Discussion on maintenance on further NR mobility enhancements", 3GPP TSG RAN WG1 #116, R1-2401255, Agenda: 8.5, Google, Feb. 26-Mar. 1, 2024, 9 pages.
"FL summary 4 on L1 enhancements for inter-cell beam management", 3GPP TSG RAN WG1 Meeting #115, R1-2312678, Agenda: 8.7.1, Fujitsu, Nov. 13-17, 2023, pp. 1-141.
Supplementary European Search Report received for corresponding European Patent Application No. 24209118.9, dated Feb. 5, 2025, 6 pages.
Office action received for corresponding European Patent Application No. 24209118.9, dated Feb. 17, 2025, 10 pages.

\* cited by examiner

CHANNEL STATE INFORMATION REPORTING PRIORITY FOR LOWER-LAYER TRIGGERED MOBILITY

TECHNOLOGICAL FIELD

The present disclosure relates generally to telecommunications and, in particular, to channel state information reporting priority for lower-layer triggered mobility.

BACKGROUND

A telecommunications system can be seen as a facility that enables communication sessions between two or more entities such as user terminals, base stations and/or other nodes by providing carriers between the various entities involved in the communications path. A telecommunications system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless telecommunications system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the telecommunications system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The telecommunications system and associated devices typically operate in accordance with a given standard or specification which sets out what the various entities associated with the system are permitted to do and how that should be achieved. Communication protocols and/or parameters which shall be used for the connection are also typically defined. One example of a telecommunications system is the Universal Mobile Telecommunications System (UMTS). Other examples of telecommunications systems are Long-Term Evolution (LTE), LTE Advanced and the so-called 5G or New Radio (NR) networks. NR is being standardized by the 3rd Generation Partnership Project (3GPP).

BRIEF SUMMARY

Example implementations of the present disclosure are directed generally to telecommunications and, in particular, to channel state information reporting priority for lower-layer triggered mobility. The present disclosure includes, without limitation, the following example implementations.

Some example implementations provide an apparatus comprising: at least one memory configured to store instructions; and at least one processing circuitry configured to access the at least one memory, and execute the instructions to cause the apparatus to at least: determine that at least two channel state information (CSI) reports are to be reported; calculate priority values associated with the at least two CSI reports, at least one of the priority values calculated based on a determination that at least one of the at least two CSI reports is a lower-layered triggered mobility (LTM) CSI report; determine that a time occupancy of physical channels scheduled to carry the at least two CSI reports at least partially overlap on a carrier, the at least two CSI reports thereby said to collide; and send one or more of the at least two CSI reports that are said to collide based on the priority values.

Some example implementations provide an apparatus comprising: means for determining that at least two channel state information (CSI) reports are to be reported; means for calculating priority values associated with the at least two CSI reports, at least one of the priority values calculated based on a determination that at least one of the at least two CSI reports is a lower-layered triggered mobility (LTM) CSI report; means for determining that a time occupancy of physical channels scheduled to carry the at least two CSI reports at least partially overlap on a carrier, the at least two CSI reports thereby said to collide; and means for sending one or more of the at least two CSI reports that are said to collide based on the priority values.

Some example implementations provide a method comprising: determining that at least two channel state information (CSI) reports are to be reported; calculating priority values associated with the at least two CSI reports, at least one of the priority values calculated based on a determination that at least one of the at least two CSI reports is a lower-layered triggered mobility (LTM) CSI report; determining that a time occupancy of physical channels scheduled to carry the at least two CSI reports at least partially overlap on a carrier, the at least two CSI reports thereby said to collide; and sending one or more of the at least two CSI reports that are said to collide based on the priority values.

Some example implementations provide a computer-readable storage medium that is non-transitory and has instructions stored therein that, in response to execution by at least one processing circuitry, causes an apparatus to at least: determine that at least two channel state information (CSI) reports are to be reported; calculate priority values associated with the at least two CSI reports, at least one of the priority values calculated based on a determination that at least one of the at least two CSI reports is a lower-layered triggered mobility (LTM) CSI report; determine that a time occupancy of physical channels scheduled to carry the at least two CSI reports at least partially overlap on a carrier, the at least two CSI reports thereby said to collide; and send one or more of the at least two CSI reports that are said to collide based on the priority values.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Figure 1:
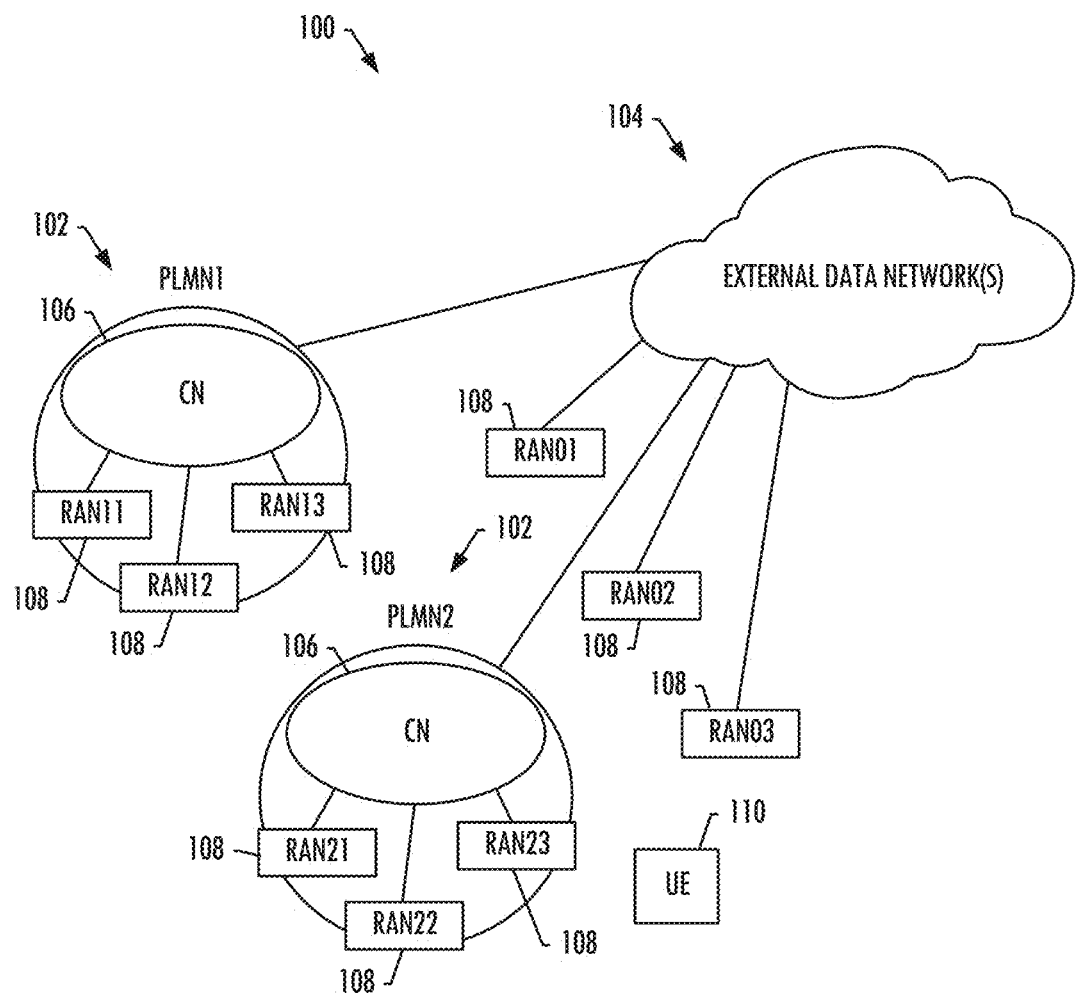
FIG. 1 illustrates a telecommunications system that includes one or more public land mobile networks (PLMNs) coupled to one or more external data networks, according to some example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably. The term "network" may refer to a group of interconnected computers including clients and servers; and within a network, these computers may be interconnected directly or indirectly by various means including via one or more switches, routers, gateways, access points or the like.

Reference may be made herein to terms specific to a particular system, architecture or the like, but it should be understood that example implementations of the present disclosure may be equally applicable to any of a number of systems, architectures and the like. For example, reference may be made to 3GPP technologies such as Global System for Mobile Communications (GSM), UMTS, LTE, LTE Advanced, 5G NR, 5G Advanced and 6G; however, it should be understood that example implementations of the present disclosure may be equally applicable to non-3GPP technologies such as IEEE 802, Bluetooth and Bluetooth Low Energy.

Further, as used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); or (c) hardware circuit(s) and/or processor(s), such as a microprocessor(s) or a portion of a microprocessor(s), that requires software (e.g., firmware) for operation, but the software may not be present when it is not needed for operation.

The above definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

FIG. 1 illustrates a telecommunications system 100 according to various example implementations of the present disclosure. The telecommunications system generally includes one or more telecommunications networks. As shown, for example, the system includes one or more public land mobile networks (PLMNs) 102 coupled to one or more other external data networks 104—notably including a wide area network (WAN) such as the Internet. Each of the PLMNs includes a core network (CN) 106 backbone such as the Evolved Packet Core (EPC) of LTE, the 5G core network (5GC) or the like; and each of the core networks and the Internet are coupled to one or more radio access networks (RANs) 108, air interfaces or the like that implement one or more radio access technologies (RATs). As used herein, a "network device" refers to any suitable device at a network side of a telecommunications network. Examples of suitable network devices are described in greater detail below.

In addition, the system includes one or more radio units that may be varyingly known as user equipment (UE) 110, terminal device, terminal equipment, mobile station or the like. The UE is generally a device configured to communicate with a network device or a further UE in a telecommunication network. The UE may be a portable computer (e.g., laptop, notebook, tablet computer), mobile phone (e.g., cell phone, smartphone), wearable computer (e.g., smartwatch), or the like. In other examples, the UE may be an Internet of things (IoT) device, an industrial IoT (IIoT device), a vehicle equipped with a vehicle-to-everything (V2X) communication technology, or the like. In operation, these UEs may be configured to connect to one or more of the RANs 108 according to their particular radio access technologies to thereby access a particular CN 106 of a PLMN 102, or to access one or more of the external data networks 104 (e.g., the Internet). The external data network may be configured to provide Internet access, operator services, 3rd party services, etc. For example, the International Telecommunication Union (ITU) has classified 5G mobile network services into three categories: enhanced mobile broadband (eMBB), ultra-reliable and low-latency communications (URLLC), and massive machine type communications (mMTC) or massive internet of things (MIoT).

Examples of radio access technologies include 3GPP radio access technologies such as GSM, UMTS, LTE, LTE Advanced, 5G NR, 5G Advanced, and 6G. Other examples of radio access technologies include IEEE 802 technologies such as IEEE 802.11 (Wi-Fi), IEEE 802.15 (including 802.15.1 (WPAN/Bluetooth), 802.15.4 (Zigbee) and 802.15.6 (WBAN)), Bluetooth, Bluetooth Low Energy (BLE), ultra wideband (UWB), and the like. Generally, a radio access technology may refer to any 2G, 3G, 4G, 5G, 6G or higher generation mobile communication technology and their different versions, as well as to any other wireless radio access technology that may be arranged to interwork with such a mobile communication technology to provide access to the CN 106 of a mobile network operator (MNO).

In various examples, a RAN 108 may be configured as one or more macrocells, microcells, picocells, femtocells or the like. The RAN may generally include one or more radio access nodes that are configured to interact with UEs 110. In various examples, a radio access node may be referred to as a base station (BS), access point (AP), base transceiver station (BTS), Node B (NB), evolved NB (eNB), macro BS, NB (MNB) or eNB (MeNB), home BS, NB (HNB) or eNB (HeNB), next generation NB (gNB), enhanced gNB (en-gNB), next generation eNB (ng-eNB), or the like. The RAN may include some type of network controlling/governing entity responsible for control of the radio access nodes. The network controlling/governing entity and radio access node may be separate or integrated into a single apparatus. The network controlling/governing entity may include processing circuitry configured to carry out various management functions, etc. The processing circuitry may be associated with a memory, computer-readable storage medium or database for maintaining information required in the management functions.

A RAN 108 may be centralized or distributed. In various examples, components of a RAN may be interconnected by Ethernet, Gigabit Ethernet, Asynchronous Transfer Mode (ATM), optical fiber, dark fiber, passive wavelength division multiplexing (WDM), WDM passive optical network (WDM-PON), optical transport network (OTN), time sensitive networking (TSN) and/or any other data link layer network, possibly including radio links. The RAN may be connected to a CN 106 through one or more gateways, network functions or the like.

Figure 2:
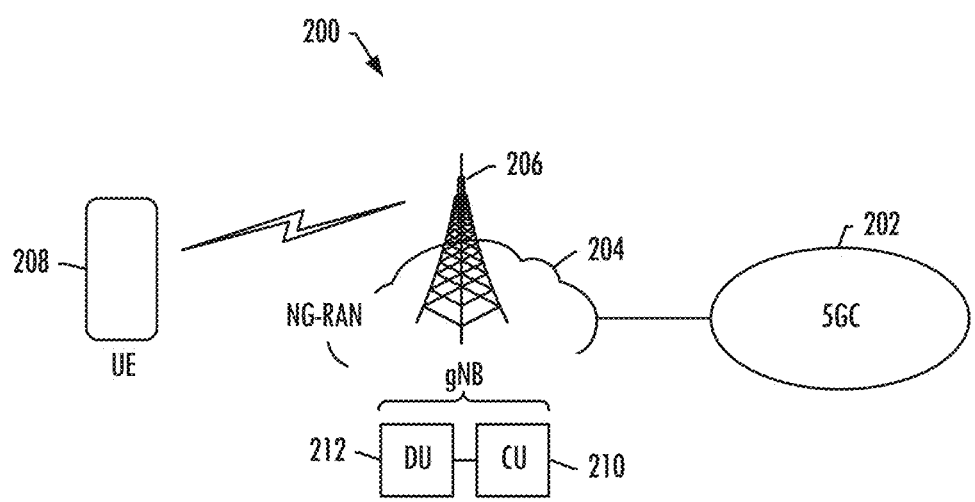
FIG. 2 illustrates a 5G deployment of a PLMN, according to some example implementations.

As will be appreciated, a PLMN 102 may be deployed in a number of different manners. In a 4G LTE deployment, the EPC is the CN 106, and the evolved UMTS terrestrial radio access network (E-UTRAN) is the RAN 108; and the E-UTRAN includes one or more eNBs (radio access nodes) configured to connect UEs 110 to the E-UTRAN to thereby access the EPC. As shown in FIG. 2, in a 5G deployment 200, the 5GC 202 is the CN, and the next generation (NG) radio access network (NG-RAN) 204 is the RAN; and the NG-RAN includes one or more gNBs 206 (radio access nodes) configured to connect UEs 208 to the NG-RAN to thereby access the 5GC. The term 'gNB' in 5G may correspond to the eNB in 4G LTE.

Some deployments of 4G LTE and 5G in particular are considered standalone (SA) deployments. Other deployments combine 4G LTE and 5G technologies, and are referred to as non-standalone (NSA) deployments. In some deployments, the E-UTRAN includes one or more ng-eNBs that are configured to communicate with the 5GC, and that may also be configured to communicate with one or more gNBs. Similarly, in another deployment, the NG-RAN may include one or more en-gNBs that are configured to communicate with the EPC, and that may also be configured to communicate with one or more eNBs. In various instances, a single UE 110, 208 a dual-mode or multimode UE, may support multiple (two or more) RANs-thereby being configured to connect to multiple RANs, such as 4G LTE and 5G.

In various instances, a single UE 110, 208 a dual-mode or multimode UE, may support multiple (two or more) RANs-thereby being configured to connect to multiple RANs. For example, a particular UE may support both LTE and 5G NR radio access technologies. In this regard, a number of deployments support dual connectivity (DC), and in some particular examples multi-radio dual connectivity (MR-DC), in which a UE may be configured to connect to two different radio access nodes connected via a non-ideal backhaul, one of the radio access nodes providing NR access and the other radio access node providing either E-UTRA or NR access. In these deployments, one radio access node may act as a master node (MN) and the other may act as a secondary node (SN).

In deployments such as the 5G deployment 200, node operations may be carried out, at least partly, in a central/centralized unit (CU) 210, such as a server, host or node, operationally coupled to a distributed unit (DU) 212, such as a radio head/node. It is also possible that node operations may be distributed among a plurality of servers, hosts or nodes. It should also be understood that the distribution of work between the 5GC 202 operations and gNB 204 operations may vary depending on implementation. Thus, a 5G network architecture may be based on a so-called CU-DU split. One gNB-CU (central node) may control one or more gNB-DUs. The gNB-CU may control a plurality of spatially separated gNB-DUs, acting at least as transmit/receive (Tx/Rx) nodes. In some example implementations, however, the gNB-DUs (also called DU) may include, for example, the radio link control (RLC), medium access control (MAC) and physical (PHY) layers, whereas the gNB-CU (also called a CU) may include the layers above RLC, such as packet data convergence protocol (PDCP), radio resource control (RRC), and an internet protocol (IP) layer. Other functional splits are also possible. It is considered that a skilled person is familiar with the open systems interconnection (OSI) model and the functionalities within each layer.

In some example implementations, the server or CU 210 may generate a virtual network through which the server communicates with the radio node. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU 212, and the boundary where the responsibility is shifted between the CU and the DU may be selected according to implementation.

To support advanced communication techniques such as beamforming, multi-antenna MIMO (multiple-input and multiple-output) deployments such as the 5G deployment 200 provide a UE procedure for reporting channel state information (CSI) that indicates the quality of a channel at a specific time. In 5G, CSI may include, for example, channel quality indicator (CQI), precoding matrix indicator (PMI), CSI reference signal (CSI-RS) resource indicator (CRI), synchronization signal (SS)/physical broadcast channel (PBCH) block (SSB) resource indicator (SSBRI), layer indicator (LI), rank indicator (RI), L1 reference signal receive power (L1-RSRP), L1 signal to interference plus noise ratio (L1-SINR), or CapabilityIndex. The network (e.g., gNB 206) may reserve a physical uplink control channel (PUCCH) or physical uplink shared channel (PUSCH) for a UE 208 to report CSI in a CSI report.

A CSI report setting may be configured in a CSI reporting configuration (CSI-ReportConfig), which can be aperiodic (using PUSCH), periodic (using PUCCH) or semi-persistent (using PUCCH, and downlink control information (DCI)-activated PUSCH). The CSI-RS resources can be periodic, semi-persistent, or aperiodic. The CSI reporting configuration may include, for example, an information element (IE) (carrier) by which a downlink (DL) component carrier (CC) in which the UE may perform a CSI measurement is configured. For CSI carried by PUCCH, the CSI reporting configuration may be configured in the cell in which the PUCCH is transmitted to carry the corresponding CSI report. And for CSI carried by PUSCH, the CSI reporting configuration may be configured in the cell that schedules the PUSCH to carry the corresponding CSI report.

Priority rules may be used for CSI reporting on a PUSCH. For example, for two overlapping PUSCHs, the priority rules may be applied for physical channels with the same priority index. CSI reports may be associated with a priority value:

$$Pri_{iCSI}(y,k,c,s) = 2 \cdot N_{cells} \cdot M_S \cdot y + N_{cells} \cdot M_S \cdot k + M_S \cdot c + s$$

In the above CSI priority formula, y=0 for aperiodic CSI reports to be carried on a PUSCH, y=1 for semi-persistent CSI reports to be carried on a PUSCH, y=2 for semi-persistent CSI reports to be carried on a PUCCH, and y=3 for periodic CSI reports to be carried on a PUCCH. In addition, k=0 for CSI reports carrying L1-RSRP or L1-SINR, and k=1 for CSI reports not carrying L1-RSRP or L1-SINR. Furthermore, c may be a serving cell index, which may be for the serving cell that contains the CSI-RS resource for CSI measurement; and $N_{cells}$ may refer to a maximum number of serving cells that a UE 208 may connect to simultaneously (maxNrofServingCells). Similarly, s may be a reporting configuration identifier (reportConfigID), and $M_s$ may refer to a maximum number of CSI report configurations that may be associated with the UE (maxNrofCSI-ReportConfigurations). According to the CSI priority formula, a first CSI report may have priority over a second CSI report if an associated $Pri_{iCSI}(y, k, c, s)$ value is lower for the first CSI report than for the second CSI report.

Two CSI reports may be said to collide if a time occupancy of the physical channels scheduled to carry the CSI reports overlap in at least one orthogonal frequency division multiplexing (OFDM) symbol, and are transmitted on the same carrier. As currently specified, when a UE 208 is configured to transmit two colliding CSI reports, if they values are different between the two CSI reports, the CSI report with a higher $Pri_{iCSI}(y, k, c, s)$ value may not be sent by the UE, except if one of they value is 2 and the other y value is 3 (for CSI reports transmitted on PUSCH). The two CSI reports may otherwise be multiplexed or either dropped based on the priority values.

If a semi-persistent CSI report to be carried on PUSCH overlaps in time with PUSCH data transmission in one or more symbols on the same carrier, and if the earliest symbol of these PUSCH channels starts no earlier than $N_2 + d_{2,1}$ symbols after the last symbol of the DCI scheduling the PUSCH where $d_{2,1}$ is the maximum of the $d_{2,1}$ associated with the PUSCH carrying semi-persistent CSI reports and the PUSCH with data transmission, the UE 208 may not transmit the CSI report. Otherwise, if the timeline requirement is not satisfied, this may be an error case.

If a UE 208 would transmit a first PUSCH that includes semi-persistent CSI reports and a second PUSCH that includes an uplink (UL)-shared channel (SCH) on the same carrier, and the first PUSCH transmission would overlap in time with the second PUSCH transmission, the UE may not transmit the first PUSCH, and instead transmit the second PUSCH. The UE may expect that the first and second PUSCH transmissions satisfy the above timing conditions for PUSCH transmissions that overlap in time when at least one of the first or second PUSCH transmissions is in response to a DCI format detection by the UE.

Currently in 3GPP, mainstream mobility has been conducted using higher layer (layer 3, L3 or RRC controlled) mobility. In this regard, L3 handover based mobility is a well-known and proven method for ensuring a robust way of handing over the UE 208 from one serving cell (source cell) of a radio access node (e.g., gNB 206) to a new serving cell (target cell) of the same or another radio access node. The method has been used at least since GSM and is still in use in 5G NR. It is expected that L3 mobility (legacy handover) will also be commonly used in the future.

As the wireless generations evolve, however, so does the need for new and different solutions enabling more flexible, more efficient and sometimes faster procedures making the system seem more agile. One such enhancement includes moving the execution of the 'handover' from one cell to another from higher layers (L3), such as RRC, to lower layers. These lower layers may be either PHY (or layer 1, L1) or MAC (or layer 2, L2). This feature is currently referred to as L1/L2-triggered mobility, or lower-layer triggered mobility (LTM), which may reduce latency, overhead and interruption time when compared to L3 handover based mobility. In a CU-DU split architecture, LTM may support one or more of intra-DU mobility, intra-CU inter-DU mobility, or inter-CU inter-DU mobility.

LTM may be a cell switch procedure in which the network may switch a UE's primary serving cell (PCell or PSCell) by sending a cell switch command, such as a MAC control element (MAC-CE). This LTM cell switch decision may be based on measurements (L1 measurements) that are performed and reported (L1 measurement report) by the UE.

Measurements and reporting are based on LTM candidate cell configuration provided by the network for one or more LTM candidate cells. An LTM candidate cell may be neighboring cells or a UE's current secondary serving cells (e.g., SCells).

Figure 3:
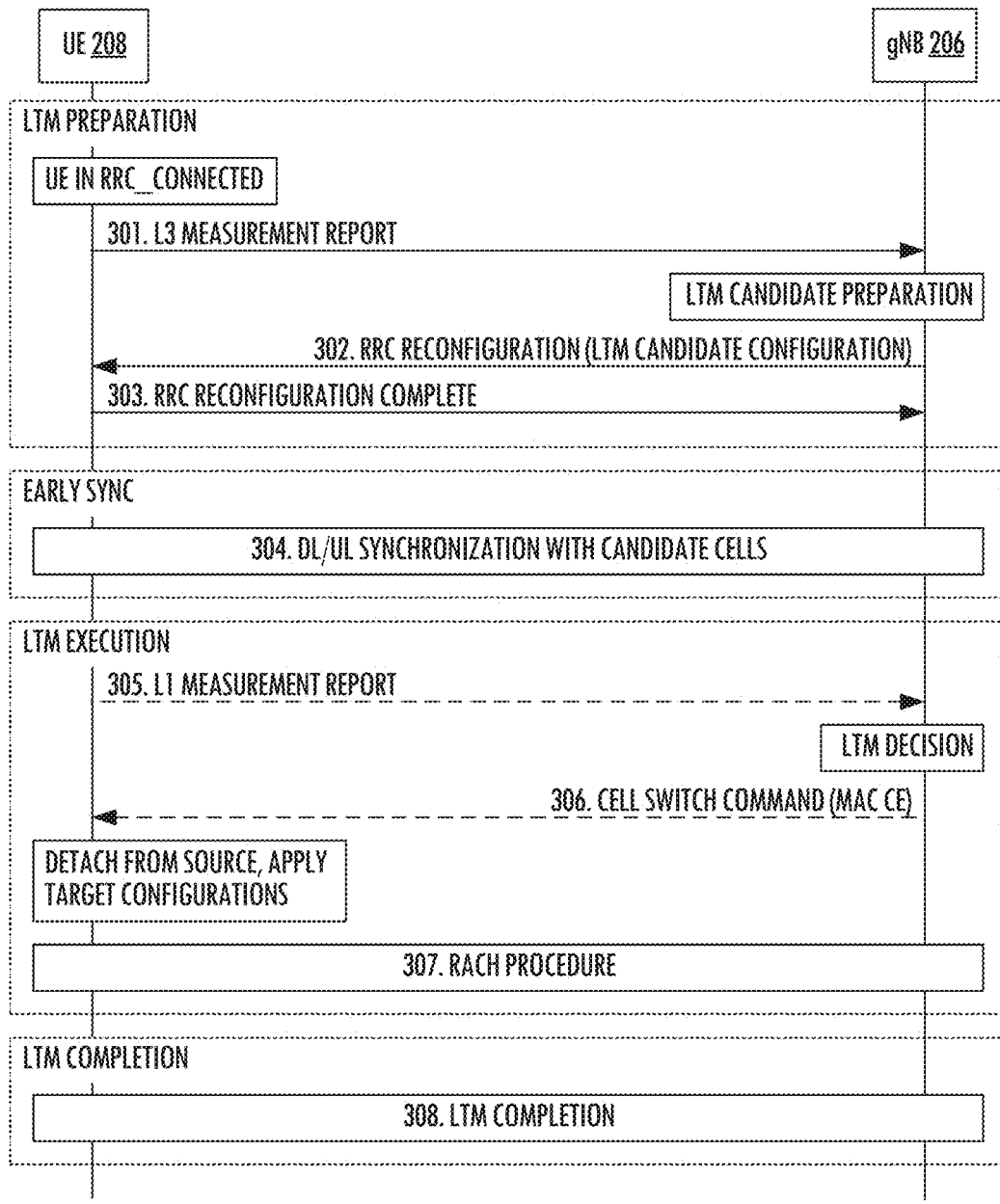
FIG. 3 illustrates a signaling chart for a lower-layer triggered mobility (LTM) procedure.

FIG. 3 illustrates a signaling chart for an LTM procedure of a UE 208 in a RRC connected state with a gNB 206, which has been proposed. During LTM preparation, as shown at step 301, the UE sends a L3 measurement report to the gNB, which decides to use LTM and initiate LTM candidate preparation. The gNB at step 302 transmits a RRC reconfiguration message to the UE, including the configuration of one or more candidate target cells. The RRC reconfiguration message may also include a configuration of L1 measurement reporting for LTM execution. The UE stores the configurations, and the UE at step 303 transmits a RRC reconfiguration complete message to the gNB.

An early synchronization of the UE 208 with the candidate target cell(s) follows LTM preparation. As shown at step 304, the UE 208 performs downlink (DL)/uplink (UL) synchronization with the candidate target cell(s). During this procedure, the UE may acquire a timing advance (TA) of respective ones of the candidate target cell(s). This early synchronization may reduce interruption during LTM execution, as compared to L3 handover based mobility. In this regard, the TA may be used to control the timing of uplink transmissions of a UE toward the candidate target cell(s). The UE may likewise have an acquired TA of the cell of the gNB to control the timing of uplink transmissions toward the gNB.

During LTM execution, the UE 208 performs L1 measurements on the configured candidate target cell(s), and the UE at step 305 transmits L1 measurement reports to the gNB 206. The gNB decides to execute a cell switch, and selects one of the candidate target cell(s) as a target cell for the cell switch. The gNB then at step 306 transmits a cell switch command (e.g., MAC-CE), to trigger cell switch. The UE switches to the configuration of the target cell; and if the TA of the target cell (from step 304) is no longer available, the UE at step 307 initiates a random access channel (RACH) procedure with the target cell to acquire the TA of the target cell. The UE then at step 308 indicates successful completion of the cell switch.

Figure 4A:
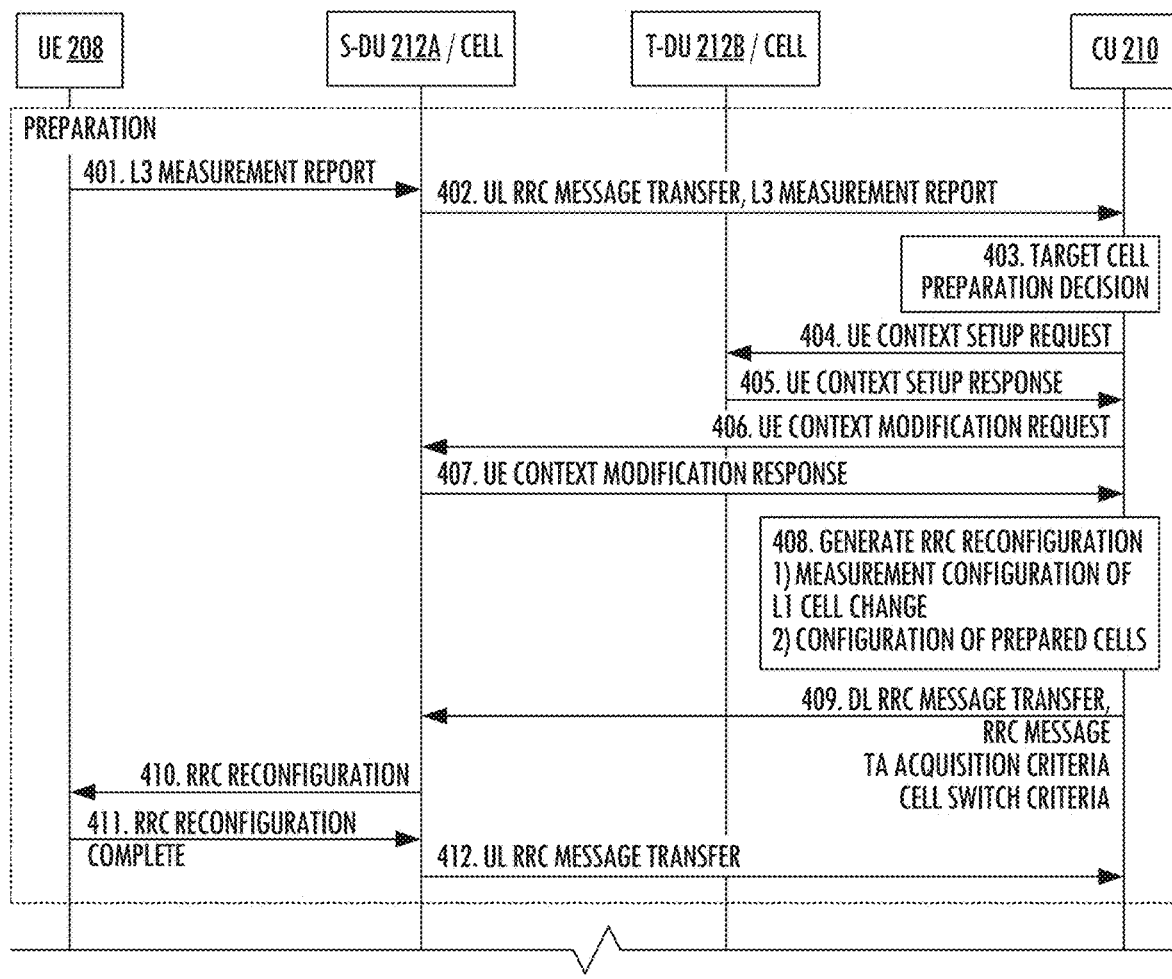
FIGS. 4A and 4B illustrate a signaling chart for an LTM procedure in a CU-DU split architecture.
Figure 4B:
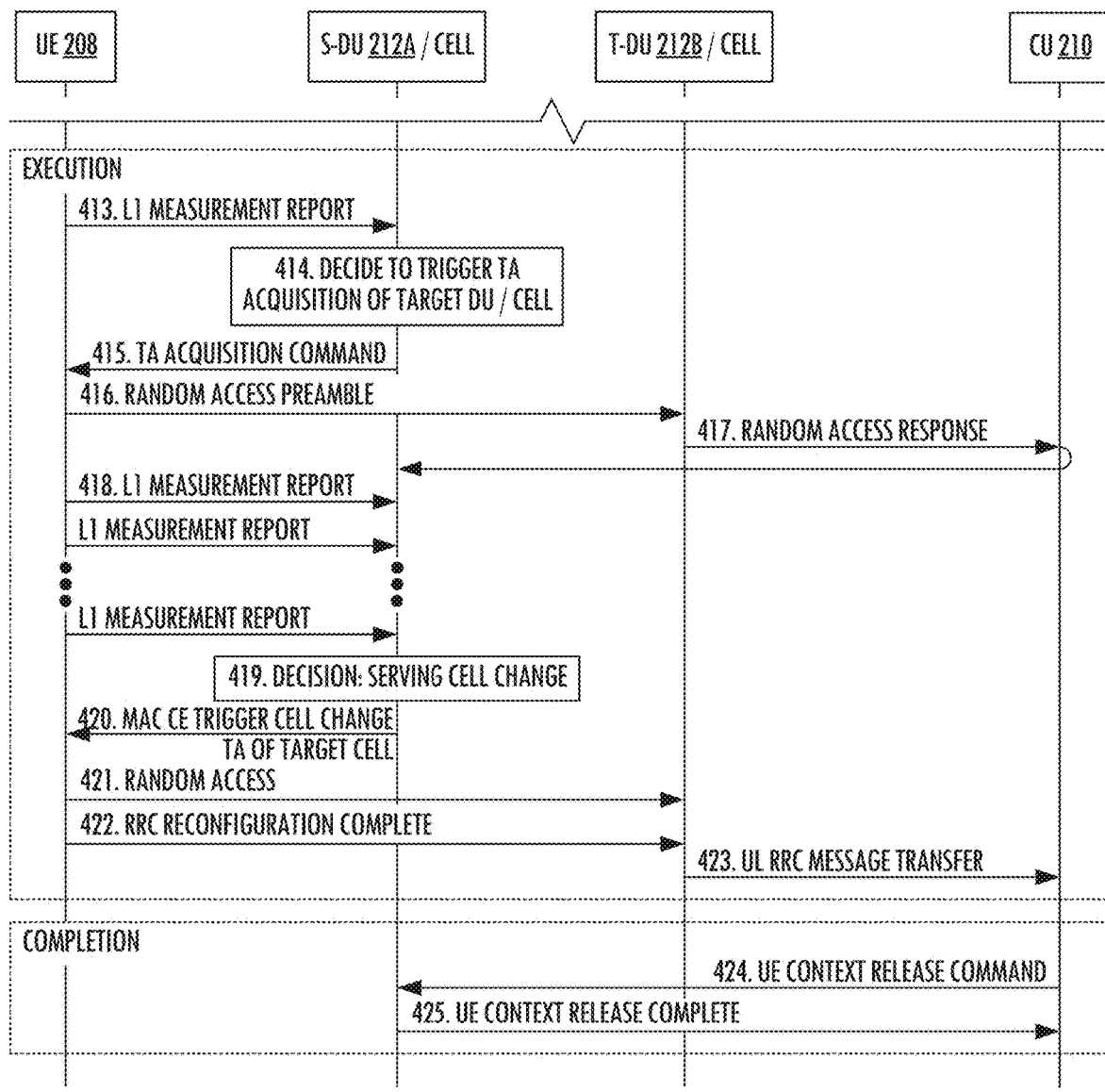

FIGS. 4A and 4B illustrate a signaling chart for an LTM procedure in a CU-DU split architecture, including a CU 210, a source DU (S-DU) 212A for a serving cell, and a target DU (T-DU) 212B for a target cell. During preparation for LTM, as shown at steps 401 and 402, the UE 208 sends a L3 measurement report to the CU via the S-DU, and the CU at step 403 decides prepare one or more candidate target cells (DUs) for LTM. As shown at steps 404, 405, 406 and 407, the CU proceeds with the UE context setup/modification procedures. At step 408, the CU generates RRC reconfiguration(s) for the configured candidate target cell(s); and at steps 409 and 410, the CU provides the configurations to the UE 208 via the S-DU.

At steps 408, 409 and 410, the CU 210 also configures the UE 208 with L1 measurement reporting for LTM execution. The CU provides the S-DU 212A with TA acquisition triggering criteria and configuration(s), as well as cell switch triggering criteria and configuration(s). The triggering criteria for TA acquisition and cell switch may be similar to measurement event report triggering conditions, e.g., A3, A4 or A5 event conditions or validity of acquired TA. The triggering conditions may include, for example, a filter configuration (for L1 measurements), trigger offsets, cell individual offsets, or the like.

At steps 411 and 412, the UE 208 sends a RRC reconfiguration complete to the CU 210 via the S-DU 212A.

During execution, at step 413 onwards, the UE 208 performs L1 measurements on the configured candidate target cell(s), and transmits L1 measurement reports to the S-DU 212A. The S-DU at step 414 decides to trigger the TA acquisition of the candidate target cell(s) (including the cell of T-DU 212B), and the S-DU at step 415 transmits a TA acquisition command to the UE 208. The UE at step 416 transmits a random access preamble to the candidate target cell(s) (T-DU 212B/cell) to signal the candidate target cell(s) to estimate the TA between the UE and the candidate target cell(s). And at step 417, the S-DU 212A/cell receives a random access response (RAR) from respective ones of the candidate target cell(s) indirectly via the CU 210. Alternatively, the UE may receive the RAR of respective ones of the candidate target cell(s), indirectly via the CU and the S-DU.

The UE 208 at step 418 transmits L1 measurements of the candidate target cell(s) to the S-DU 212A. The S-DU at steps 419 and 420 decides to initiate a cell change to the T-DU 212B/cell, and transmits a cell switch command (e.g., MAC-CE) to trigger the cell switch. In examples in which the RAR is received at the S-DU at step 417 (instead of the UE), the S-DU provides the TA of the T-DU/cell to the UE. If the TA of the T-DU/cell is still valid, the UE may skip the RACH procedure at step 421 when executing the cell switch. And at steps 422, 423, 424 and 425, the UE, S-DU, T-DU and CU proceed with completion of the LTM procedure.

In LTM, the L1 measurement reports may be LTM CSI reports, and the L1 measurements may include RSRP measurements (such as L1-RSRP). The L1 RSRP measurements are a measure of the power received from a reference signal (RS). In some examples, the reference signal may be the synchronization signal (SS), with the corresponding RSRP measurements referred to as SS-RSRP. In other examples, the reference signal may be the CSI-RS, with the corresponding RSRP measurements referred to as CSI-RSRP. The SS-RSRP in particular may be defined as the linear average over the power contributions of resource elements that carry secondary synchronization signals (SSS). The SS-RSRP may be measured among the reference signals corresponding SSBs.

In some examples, the UE 208 may be provided information about measurement resources (e.g., SSBs) from LTM candidate cells so that UE can make the appropriate L1 measurements. An LTM CSI report setting may also be configured in an LTM CSI reporting configuration (LTM-CSI-ReportConfig), which can be aperiodic (using PUSCH), periodic (using PUCCH) or semi-persistent (using PUCCH or PUSCH). The LTM CSI reporting configuration may include parameters(s) for time-domain behavior provided by a configuration type (ltm-ReportConfigType), which may be set to 'aperiodic', 'semiPersistentOnPUCCH', 'semiPersistentOnPUSCH', or 'periodic'. For 'periodic' and 'semiPersistentOnPUCCH'/'semiPersistentOnPUSCH' CSI reporting, the configured periodicity and slot offset applies in the numerology of the UL BWP in which the CSI report is configured to be transmitted on. The parameters in the LTM CSI reporting configuration may also include the number of candidate cells (noOfReportedCells) and the number of reference signals per candidate cell (noOfReportedRS-PerCell) comprising L1 measurement results associated with a current secondary serving cell SpCell if so configured (spCellInclusion).

In some examples, a UE 208 may be configured with a set of LTM CSI reporting configurations including one or more LTM CSI reporting configurations (LTM-CSI-ReportConfigs). The UE may also, separately, be configured with a CSI reporting configuration for CSI reports that are not LTM CSI reports (at times referred to as a legacy CSI reporting configuration for a legacy CSI report), which may be used for serving cell beam management (BM) and CSI acquisition. Each of the CSI reporting configurations (LTM and legacy/serving cell CSI reporting/BM CSI reporting) may have its own identifier (ID) space or ID value range (report configuration identity) running from 0 to a certain number. As an example, the legacy (or serving cell CSI reporting/BM CSI reporting) may have ID space/value range for legacy CSI reporting configurations. As an example, the LTM CSI may have LTM specific ID space/value range for LTM CSI reporting configurations.

The UE 208 may be configured with one or more LTM CSI reporting configurations each of which includes an LTM CSI resource configuration containing the information of resources to be used for channel measurements (e.g., L1-RSRP measurements). A LTM CSI resource configuration may include SSBs from one or more candidate cells. For each LTM CSI reporting configuration, the UE may be configured to report M beams from each of the L configured candidate cells. In this regard, each LTM CSI resource configuration (LTM-CSI-ResourceConfig) may include configuration of a LTM-CSI-SSB-ResourceSet that includes a list of Z≥1 SS/PBCH block indices (given by ltm-CSI-SSB-ResourceList) and a list of ZLTM-CandidateIds (given by ltm-CandidateIDList) referring to candidate cells associated with the SS/PBCH block indices. For each candidate cell, the UE may determine the time-domain behavior of a SS/PBCH block resource from ssb-Periodicity and ssb-PositionsInBurst, and the frequency domain behavior of a SS/PBCH block resource may be determined by the higher-layer parameters subCarrierSpacing, ssbFrequency.

If a UE 208 is configured with an LTM CSI reporting configuration (LTM-CSI-ReportConfig), and if the UE is configured with spCellInclusion, the UE may report in a single reporting instance noOfReportedRS-PerCell different SSBRI for the current SpCell and each of the noOfReportedCells−1 candidate cells. Otherwise, the UE may report in a single reporting instance noOfReportedRS-PerCell different SSBRI for each of the noOfReportedCell candidate cells. In this regard, SSBRI k (k≥0) may corresponds to the configured (k+1)-th entry of the associated ltm-CSI-SSB-ResourceList in the corresponding LTM-CSI-SSB-ResourceSet. And if spCellInclusion is configured, SSB resources in ltm-CSI-SSB-ResourceList associated with the current SpCell may be the entries where physical layer cell ID (PCI) and frequency information (e.g., given by SSB frequency) of the associated candidate cell (given in ltm-CandidateIdList) is equal to the PCI and frequency information (given by SSB frequency) of the current SpCell.

In case of a collision between a LTM CSI report and a legacy CSI report, the LTM CSI report may be prioritized. As an example, if the time occupancy of the physical channels scheduled to carry a LTM CSI report and the legacy CSI report overlap in at least one OFDM symbol and are transmitted on the same carrier, the LTM CSI report may be transmitted as having priority over the legacy CSI report. Another example, if the CSI priority formula ($Pri_{iCSI}$(y, k, c, s)=$2 \cdot N_{cells} \cdot M_S \cdot y + N_{cells} \cdot M_S \cdot k + M_S \cdot c + s$) gives the same priority value for colliding LTM and legacy (serving cell BM) CSI reports, the LTM CSI report may be prioritized. In the case that two LTM CSI reports collide, however, the CSI priority formula may be inadequate to properly capture LTM CSI reporting priority. The serving cell index c for a legacy CSI report may refer to the serving cell that contains the CSI-RS resource for CSI measurement, but this may not be sufficient for an LTM CSI report since beam measurements from multiple cells may be reported in the same LTM CSI report.

According to some example implementations of the present disclosure, a UE 208 may be configured to calculate the priority value for at least one CSI report based on a determination that the CSI report is an LTM CSI report. This may include, for example, a particular specification of the serving cell index c variable for the LTM CSI report. Some examples may also include a particular specification of the $N_{cells}$ variable for the LTM CSI report. For an LTM CSI report and a legacy CSI report, the UE may prioritize the LTM CSI report; and for two LTM CSI reports or two legacy CSI reports, the UE may prioritize the reports according to their respective priority values. In some examples, For an LTM CSI report and a legacy CSI report, the UE may prioritize the reports according to their respective priority values.

More generally, according to some example implementations, a UE 208 may be configured to determine that at least two CSI reports are to be reported, such as based on CSI reporting configurations. The UE may be configured to calculate priority values associated with the CSI reports. In this regard, at least one of the priority values may be calculated based on a determination that at least one of the CSI reports is an LTM CSI report. In this regard, the LTM CSI report may be associated with an LTM CSI reporting configuration, such as for reporting measurements for one or more cells including one or more candidate cells configured for LTM. The UE may be configured to determine that the CSI reports collide in that a time occupancy of physical channels scheduled to carry the CSI reports at least partially overlap on a carrier. And the UE may be configured to send one or more of the CSI reports that are said to collide based on the priority values. The UE may be configured to send the one or more of the CSI reports at step 305 (FIG. 3) or step 418 (FIG. 4B), with the appropriate determinations made beforehand.

The UE 208 may calculate the priority value associated with an LTM CSI report in a number of different manners. In some examples, the priority value may be calculated based on the CSI priority formula ($Pri_{iCSI}$(y, k, c, s)=$2 \cdot N_{cells} \cdot M_S \cdot y + N_{cells} \cdot M_S \cdot k + M_S \cdot c + s$) in which either or both of the serving cell index c or $N_{cells}$ variables are specified for LTM CSI reports.

In some examples in which the LTM CSI report is associated with an LTM CSI reporting configuration, the priority value may be calculated based on a serving cell index value for a serving cell (e.g., PCell or PSCell) at which the LTM CSI reporting configuration is configured. In other examples, the priority value associated with an LTM CSI report may be calculated based on a serving cell index value for a serving cell to which the LTM CSI report is to be reported. In some examples, this may also be the cell in which the PUCCH/PUSCH is transmitted to carry the LTM CSI report. In particular, for example, the serving cell index c for the priority value calculation may refer to the serving cell index value for the serving cell at which the LTM CSI reporting configuration is configured, or the serving cell to which the LTM CSI report is to be reported.

In some other examples, the priority value associated with an LTM CSI report may be calculated based on the CSI priority formula including either or both of the serving cell index c variable or the maximum number of serving cells $N_{cells}$ variable set to a predefined (i.e. pre-determined/specified) value, which may be a constant value.

In other examples, the UE 208 may calculate the priority value associated with an LTM CSI report based on a candidate cell identifier for one of the candidate cell(s) in the LTM CSI reporting configuration. In this regard, the serving cell index c for the priority value calculation may refer to the candidate cell identifier for one of the candidate cell(s). The cell identifier may be, for example, a lowest candidate cell identifier for the candidate cell(s), or the lowest candidate cell identifier for the candidate cell(s) that is not a current serving cell (e.g., a current primary serving cell), which may be the lowest candidate cell identifier where a reference signal is transmitted to the UE to make one or more measurements. In another example, the cell identifier may be the lowest candidate cell identifier for which a measurement with valid measurement values (e.g., L1-RSRP) is being reported in the LTM CSI report.

In yet another example, the cell identifier for the priority value calculation an LTM CSI report may be the lowest cell identifier for the candidate cell(s) for which at least one transmission configuration indicator (TCI) state has been activated, a timing advance (TA) has been acquired using UE-based TA measurement, and/or a physical downlink control channel (PDCCH) ordered physical random access channel (PRACH) transmission has been performed. In another example, the lowest cell identifier may be the lowest cell identifier for which a measurement with valid measurement values (e.g., L1-RSRP) is being reported, and for which at least one TCI state has been activated, a TA has been acquired using UE-based TA measurement, and/or a PDCCH ordered PRACH transmission has been performed.

In some examples, the priority value associated with an LTM CSI report may be calculated based on a maximum number of candidate cells configured for LTM. In this regard, the maximum number of serving cells $N_{cells}$ variable in the CSI priority formula may refer to maximum number of candidate cells configured for LTM. This maximum may be the maximum number of candidate cells configured for measurements and reports associated with the LTM CSI report. In another example, the maximum may be the maximum number of candidate cells configured for measurements and reports across all configured LTM CSI reports for a current primary serving cell.

To further illustrate some example implementations of the present disclosure, the priority value associated with a CSI report may be calculated based on the CSI priority formula:

$$\text{Pri}_{iCSI}(y,k,c,s) = 2 \cdot N_{cells} \cdot M_S \cdot y + N_{cells} \cdot M_S \cdot k + M_S \cdot c + s$$

where y=0, 1, 2 or 3, and k=0 or 1, as described above. Similarly, s may be a reporting configuration identifier (reportConfigID), and $M_s$ may refer to a maximum number of CSI report configurations that may be associated with the UE (maxNrofCSI-ReportConfigurations), also as described above. And for a legacy LTM CSI Report, c may be a serving cell index, which may be for the serving cell that contains the CSI-RS resource for CSI measurement; and $N_{cells}$ may refer to a maximum number of serving cells that a UE 208 may connect to simultaneously (maxNrofServingCells).

In one example, for an LTM CSI report, c may refer to the serving cell index for which the LTM CSI reporting configuration is configured. In this example, as before, $N_{cells}$ may refer to a maximum number of serving cells that a UE 208 may connect to simultaneously (maxNrofServingCells).

In another example, for an LTM CSI report, c may refer to the serving cell index on which the LTM CSI report is transmitted. In this example, again, $N_{cells}$ may refer to a maximum number of serving cells that a UE 208 may connect to simultaneously (maxNrofServingCells).

In another example, for an LTM CSI report, a predefined (e.g., constant) value c=0, 1, 2, 3, . . . N may be used, and a predefined (e.g., constant) value $N_{cells}$=0, 1, 2, 3, . . . M may be used. In some examples, the value c may be configured as reporting configuration specific value (e.g. via RRC). In some examples, the same (configured RRC) value c may be used for all the LTM CSI reporting configurations. In some examples, the value $N_{cell}$ may be configured as reporting configuration specific value (e.g. via RRC). In some examples, the same (configured RRC) value $N_{cell}$ may be used for all the LTM CSI reporting configurations.

In another example, for an LTM CSI report, c may refer to the lowest candidate cell identifier for which measurements are configured for reporting. In this example, $N_{cells}$ may refer to the maximum number candidate cells configured for measurements and reports associated with the LTM CSI report, or the maximum number candidate cells configured measurements and reports across all configured LTM CSI reports for the current serving cell.

In another example, for an LTM CSI report, c may refer to the lowest candidate cell identifier for which measurements are reported in the report. In this example, $N_{cells}$ may refer to the maximum number candidate cells configured for measurements and reports associated with the LTM CSI report, or the maximum number candidate cells configured measurements and reports across all configured LTM CSI reports for the current serving cell.

In another example, for an LTM CSI report, c may refer to the lowest candidate cell identifier for which measurements are configured for reporting that is not a current serving cell (e.g., a current primary serving cell). Also in this example, $N_{cells}$ may refer to the maximum number candidate cells configured for measurements and reports associated with the LTM CSI report, or the maximum number candidate cells configured measurements and reports across all configured LTM CSI reports for the current serving cell.

In another example, for an LTM CSI report, c may refer to the lowest candidate cell identifier for which measurements are configured for reporting that is a serving cell (primary or secondary).

In yet another example, for an LTM CSI report, c may refer to the lowest candidate cell identifier value being reported in the LTM CSI report with valid (L1-RSRP) measurements. In one example, the reporting of valid RSRP measurement may comprise of reporting the RSRP value that is in a valid value range for L1-RSRP reporting. Again, in this example, $N_{cells}$ may refer to the maximum number candidate cells configured for measurements and reports associated with the LTM CSI report, or the maximum number candidate cells configured measurements and reports across all configured LTM CSI reports for the current serving cell.

In any of the examples, $N_{cells}$ may refer to the maximum number candidate cells configured for measurements and reports associated with the LTM CSI report, or the maximum number candidate cells configured measurements and reports across all configured LTM CSI reports for the current serving cell.

In another example, for an LTM CSI report, c may refer to the lowest candidate cell identifier for which at least one of at least one TCI state has been activated, TA has been acquired using UE-based TA measurement, or PDCCH ordered PRACH transmission has been performed. And again, $N_{cells}$ may refer to the maximum number candidate cells configured for measurements and reports associated with the LTM CSI report, or the maximum number candidate cells configured measurements and reports across all configured LTM CSI reports for the current serving cell.

In another example, for an LTM CSI report, c may refer to the lowest candidate cell identifier for which at least one of at least one TCI state has been activated, TA has been acquired using UE-based TA measurement, or PDCCH ordered PRACH transmission has been performed, and being reported in the report with at least one valid (L1-RSRP) measurement. And yet again, $N_{cells}$ may refer to the maximum number candidate cells configured for measurements and reports associated with the LTM CSI report, or the maximum number candidate cells configured measurements and reports across all configured LTM CSI reports for the current serving cell.

An LTM CSI report is said to have priority over a legacy CSI report. And a first LTM CSI report is said to have priority over a second LTM CSI report if the associated $Pri_{iCSI}(y, k, c, s)$ value is lower for the first LTM CSI report than for the second LTM CSI report.

In one example the UE may determine that a channel state information (CSI) report is to be reported, wherein the CSI report may be an LTM CSI report. The UE may calculate priority value associated with the LTM CSI report based on one or more parameters. In some examples, the priority value associated with the LTM CSI report may be based on at least one parameter associated with cell identifier (e.g., value c in the priority value calculation formula). In some examples, the priority value associated with the LTM CSI report may be based on at least one parameter associated with the cell on which the reporting is configured or the report is transmitted (e.g., value c in the priority value calculation formula). In some examples, the priority value associated with the LTM CSI report may be based on at least one parameter associated with a number of configured (candidate and/or serving) cells (e.g., value Ncells in the priority value calculation formula). The UE may calculate the priority value for one or more CSI reports that are to be transmitted on overlapping resources (e.g. time and/or frequency). The UE may send one or more of the at least two CSI reports that are said to collide based on the priority values. In some examples, the UE may drop the one or more lower priority reports if the reports cannot multiplexed on the same reporting resource (time and/or frequency). In one example, lower priority value (based on priority calculation formula) may indicate higher priority.

In one example, the priority value associated with the LTM CSI report may be based on (e.g., value c in the priority value calculation formula may be based on) the lowest candidate cell identifier from all the candidate cells configured for measurement and reporting (i.e., not only the cells which are being reported as there may be only a subset of the cells selected for reporting).

In one example, the priority value associated with the LTM CSI report may be based on (e.g., value c in the priority value calculation formula may be based on) the lowest candidate cell identifier from all the candidate cells which are being reported in the CSI report.

Figure 5:
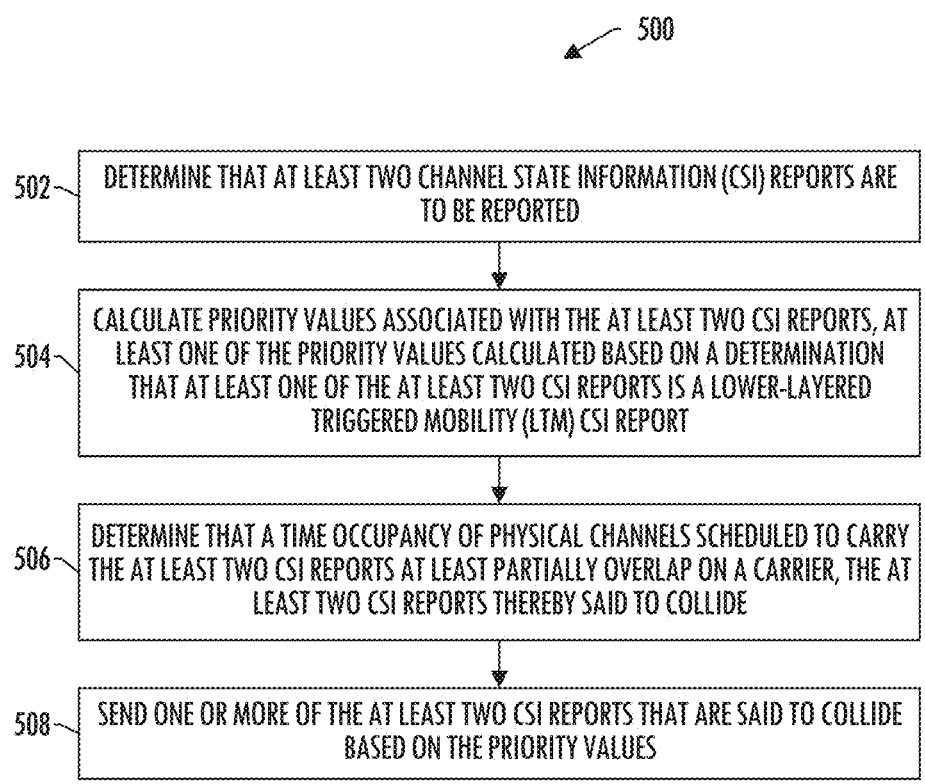
FIG. 5 is a flowchart illustrating various steps in a method that may be implemented at a user equipment, according to some example implementations.

FIG. 5 is a flowchart illustrating various steps in a method 500 that may be implemented at a UE 208, according to some example implementations. The method includes determining that at least two channel state information (CSI) reports are to be reported, as shown at block 502. The method includes calculating priority values associated with the at least two CSI reports, at least one of the priority values calculated based on a determination that at least one of the at least two CSI reports is a lower-layered triggered mobility (LTM) CSI report, as shown at block 504. The method includes determining that a time occupancy of physical channels scheduled to carry the at least two CSI reports at least partially overlap on a carrier, the at least two CSI reports thereby said to collide, as shown at block 506. And the method includes sending one or more of the at least two CSI reports that are said to collide based on the priority values, as shown at block 508.

In some examples, an LTM CSI report of the at least two CSI reports is associated with an LTM CSI reporting configuration. In some of these examples, the priority value is associated with the LTM CSI report, and the priority value is calculated at block 504 based on a serving cell index value for a serving cell at which the LTM CSI reporting configuration is configured.

In some examples, the priority values include a priority value associated with the LTM CSI report, and the priority value is calculated at block 504 based on a serving cell index value for a serving cell to which the LTM CSI report is to be reported.

In some examples, the priority values include a priority value associated with an LTM CSI report of the at least two LTM CSI reports, and the priority value is calculated at block 504 based on a CSI priority formula including at least one of a serving cell index variable or a maximum number of serving cells variable set to a predefined value.

In some examples, an LTM CSI report of the at least two CSI reports is associated with an LTM CSI reporting configuration for reporting measurements for one or more cells including one or more candidate cells configured for LTM. In some of these examples, the priority values include a priority value associated with the LTM CSI report, and the priority value is calculated at block 504 based on a candidate cell identifier for one of the one or more candidate cells.

In some examples, the priority value associated with the LTM CSI report is calculated at block 504 based on a lowest candidate cell identifier for the one or more candidate cells.

In some examples, the priority value associated with the LTM CSI report is calculated at block 504 based on the lowest candidate cell identifier for the one or more candidate cells that is not a current serving cell.

In some examples, the priority value associated with the LTM CSI report is calculated at block 504 based on a lowest candidate cell identifier for which a measurement with valid measurement values is being reported in the LTM CSI report.

In some examples, the priority value associated with the LTM CSI report is calculated at block 504 based on a lowest cell identifier for the one or more candidate cells for which at least one of at least one transmission configuration indicator (TCI) state has been activated, a timing advance (TA) has been acquired using user equipment (UE)-based TA measurement, or a physical downlink control channel (PDCCH) ordered physical random access channel (PRACH) transmission has been performed.

In some examples, the priority value associated with the LTM CSI report is calculated at block 504 based on the lowest cell identifier for which a measurement with valid measurement values is being reported, and for which at least one of at least one TCI state has been activated, a TA has been acquired using UE-based TA measurement, or a PDCCH ordered PRACH transmission has been performed.

In some examples, the priority values include a priority value associated with an LTM CSI report of the at least two CSI reports, and the priority value associated with the LTM CSI report is calculated at block 504 based on a maximum number of candidate cells configured for LTM.

In some examples, the priority value associated with the LTM CSI report is calculated at block 504 based on the maximum number of candidate cells configured for measurements and reports associated with the LTM CSI report.

In some examples, the priority value associated with the LTM CSI report is calculated at block 504 based on the maximum number of candidate cells configured for measurements and reports across all configured LTM CSI reports for a current primary serving cell.

According to example implementations of the present disclosure, a telecommunications system 100 or PLMN 102, and its components such as a UE 110, gNB 206, UE 208, CU 210, DU 212, S-DU 212A and/or T-DU 212B, may be implemented by various means. Means for implementing the system and its components may include hardware, firmware, software, or combinations thereof. In some examples, one or more apparatuses may be configured to function as or otherwise implement the system and its components shown and described herein. In examples involving more than one apparatus, the respective apparatuses may be connected to or otherwise in communication with one another in a number of different manners, such as directly or indirectly via a wired or wireless network or the like.

According to some example implementations, at least some of the method 500 described with respect to FIG. 5 may be carried out by an apparatus comprising means for performing functions corresponding steps of the method. Examples of a suitable apparatus may include a user equipment, user device, user terminal or the like.

Figure 6:
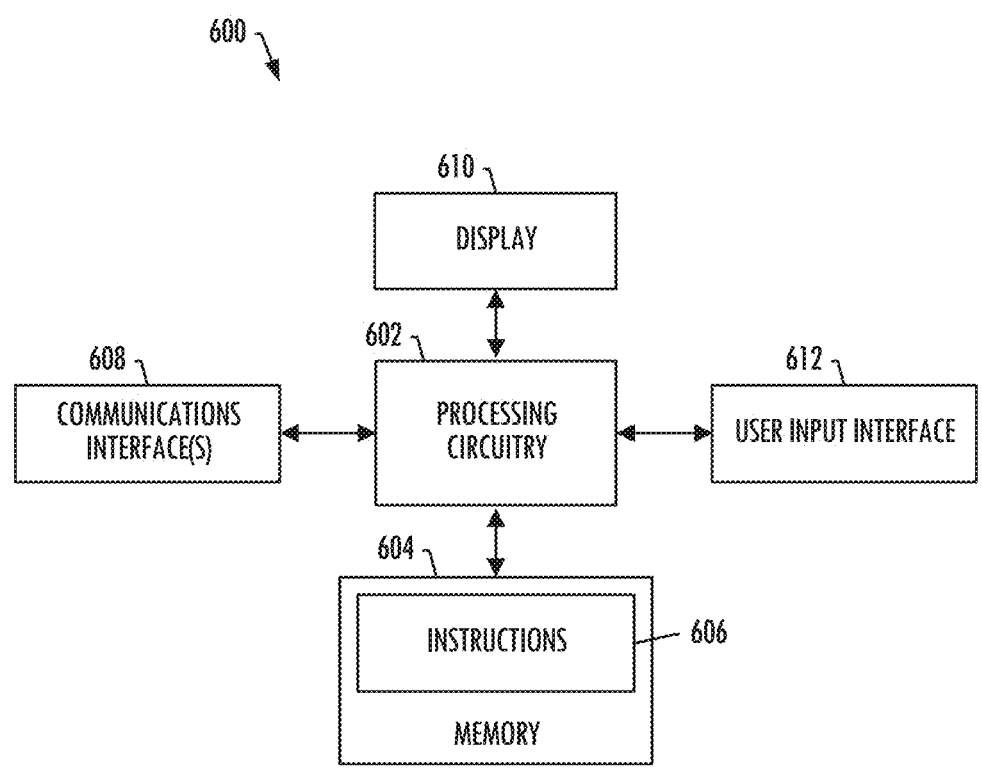
FIG. 6 illustrates an apparatus according to some example implementations.

FIG. 6 illustrates an apparatus 600 in which means for performing various functions includes hardware, alone or under direction of one or more computer programs from a computer-readable storage medium or other memory, such as computer memory, according to some example implementations of the present disclosure. Generally, an apparatus of example implementations of the present disclosure may comprise, include or be embodied in one or more fixed or portable electronic devices. Examples of suitable electronic devices include a wearable computer, mobile phone, portable computer, desktop computer, workstation computer, server (server computer) or the like. The apparatus may include one or more of each of a number of components such as, for example, processing circuitry 602 connected to computer-readable storage medium or other memory 604.

The processing circuitry 602 may be composed of one or more processors alone or in combination with one or more computer-readable storage media. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 604 (of the same or another apparatus).

The processing circuitry 602 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 604 is generally any piece of computer hardware that is capable of storing information such as, for example, data, computer programs, instructions 606 (e.g., computer-readable program code) and/or other suitable information either on a temporary basis and/or a permanent basis. The memory may include volatile and/or non-volatile memory, and may be fixed or removable. Examples of suitable memory include recording media, random access memory (RAM), read-only memory (ROM), a hard drive, a flash memory, a thumb drive, a removable computer diskette, an optical disk or some combination thereof.

The memory 604 is a non-transitory device capable of storing information. One example of a suitable memory is a computer-readable storage medium, which is distinguishable from a computer-readable transmission medium capable of carrying information from one location to another. Examples of suitable computer-readable transmission media comprise electronic carrier signals, telecommunications signals, software distribution packages, or some combination thereof. As used herein, the term "non-transitory" is a limitation of the medium itself (i.e., tangible, not a signal) as opposed to a limitation on data storage persistency (e.g., RAM versus ROM). A computer-readable medium as described herein generally refers to a computer-readable storage medium or computer-readable transmission medium. A computer-readable medium is any entity or device capable in which information, such as one or more computer programs or portions thereof, may be stored and carried.

In addition to the memory 604 (e.g., computer-readable storage medium), the processing circuitry 602 may also be connected to one or more interfaces for displaying, transmitting and/or receiving information. The interfaces may include a communications interface 608 and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 610 and/or one or more user input interfaces 612. The display may be configured to present or otherwise display information to a user, suitable examples of which include a liquid crystal display (LCD), light-emitting diode (LED) display, organic LED (OLED) display, active-matrix OLED (AMOLED) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like.

The user interfaces may further include one or more interfaces for communicating with peripherals such as printers, scanners or the like.

Execution of the instructions 606 by the processing circuitry 602, or storage of the instructions in the memory 604, supports combinations of operations for implementing example implementations of the present disclosure. In this manner, an apparatus 600 may comprise at least one processing circuitry and at least one memory coupled to the at least one processing circuitry, where the at least one processing circuitry is configured to execute instructions stored in the at least one memory. It will also be understood that one or more functions, and combinations of functions, may be implemented by special purpose hardware-based computer systems and/or processing circuitry which perform the specified functions, or combinations of special purpose hardware and program code instructions.

Some example implementations of the present disclosure may also be carried out in the form of a computer process defined by one or more computer programs or portions thereof. Example implementations of the present disclosure may be carried out by executing at least one portion of a computer program comprising instructions. The computer program may be in source code form, object code form, or in some intermediate form. The computer program may be stored in a computer-readable medium that is readable by a computer, processing circuitry or other suitable apparatus. As indicated above, for example, the computer program may be stored in a memory, such as a computer-readable storage medium. Additionally or alternatively, for example, the computer program may be stored in a computer-readable transmission medium. The coding of software for carrying out example implementations of the present disclosure is well within the scope of a person of ordinary skill in the art.

As will be appreciated, any suitable instructions may be loaded onto a computer, a processing circuitry or other programmable apparatus from a memory or a computer-readable medium (e.g., computer-readable storage medium, computer-readable transmission medium) to produce a particular machine, such that the particular machine becomes a means for implementing the functions specified herein. The instructions may also be stored in a computer-readable medium that can direct a computer, a processing circuitry or other programmable apparatus to function in a particular manner to thereby generate a particular machine or particular article of manufacture. In some examples, the instructions stored in the computer-readable medium may produce an article of manufacture, where the article of manufacture becomes a means for implementing functions described herein. The instructions may be retrieved from a computer-readable medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of instructions comprising program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

As explained above and reiterated below, the present disclosure includes, without limitation, the following example implementations.

Clause 1. An apparatus comprising: at least one memory configured to store instructions; and at least one processing circuitry configured to access the at least one memory, and execute the instructions to cause the apparatus to at least: determine that at least two channel state information (CSI) reports are to be reported; calculate priority values associated with the at least two CSI reports, at least one of the priority values calculated based on a determination that at least one of the at least two CSI reports is a lower-layered triggered mobility (LTM) CSI report; determine that a time occupancy of physical channels scheduled to carry the at least two CSI reports at least partially overlap on a carrier, the at least two CSI reports thereby said to collide; and send one or more of the at least two CSI reports that are said to collide based on the priority values.

Clause 2. The apparatus of clause 1, wherein an LTM CSI report of the at least two CSI reports is associated with an LTM CSI reporting configuration, and wherein the priority value is associated with the LTM CSI report, and the priority value is calculated based on a serving cell index value for a serving cell at which the LTM CSI reporting configuration is configured.

Clause 3. The apparatus of clause 1 or clause 2, wherein the priority values include a priority value associated with the LTM CSI report, and the priority value is calculated based on a serving cell index value for a serving cell to which the LTM CSI report is to be reported.

Clause 4. The apparatus of any of clauses 1 to 3, wherein the priority values include a priority value associated with an LTM CSI report of the at least two LTM CSI reports, and the priority value is calculated based on a CSI priority formula including at least one of a serving cell index variable or a maximum number of serving cells variable set to a predefined value.

Clause 5. The apparatus of any of clauses 1 to 4, wherein an LTM CSI report of the at least two CSI reports is associated with an LTM CSI reporting configuration for reporting measurements for a one or more cells including one or more candidate cells configured for LTM, and wherein the priority values include a priority value associated with the LTM CSI report, and the priority value is calculated based on a candidate cell identifier for one of the one or more candidate cells.

Clause 6. The apparatus of clause 5, wherein the priority value associated with the LTM CSI report is calculated based on a lowest candidate cell identifier for the one or more candidate cells.

Clause 7. The apparatus of clause 6, wherein the priority value associated with the LTM CSI report is calculated based on the lowest candidate cell identifier for the one or more candidate cells that is not a current serving cell.

Clause 8. The apparatus of any of clauses 5 to 7, wherein the priority value associated with the LTM CSI report is calculated based on a lowest candidate cell identifier for which a measurement with valid measurement values is being reported in the LTM CSI report.

Clause 9. The apparatus of any of clauses 5 to 8, wherein the priority value associated with the LTM CSI report is calculated based on a lowest cell identifier for the one or more candidate cells for which at least one of at least one transmission configuration indicator (TCI) state has been activated, a timing advance (TA) has been acquired using user equipment (UE)-based TA measurement, or a physical downlink control channel (PDCCH) ordered physical random access channel (PRACH) transmission has been performed.

Clause 10. The apparatus of clause 9, wherein the priority value associated with the LTM CSI report is calculated based on the lowest cell identifier for which a measurement with valid measurement values is being reported, and for which at least one of at least one TCI state has been activated, a TA has been acquired using UE-based TA measurement, or a PDCCH ordered PRACH transmission has been performed.

Clause 11. The apparatus of any of clauses 1 to 10, wherein the priority values include a priority value associated with an LTM CSI report of the at least two CSI reports, and the priority value associated with the LTM CSI report is calculated based on a maximum number of candidate cells configured for LTM.

Clause 12. The apparatus of any of clauses 9 to 11, wherein the priority value associated with the LTM CSI report is calculated based on the maximum number of candidate cells configured for measurements and reports associated with the LTM CSI report.

Clause 13. The apparatus of any of clauses 9 to 12, wherein the priority value associated with the LTM CSI report is calculated based on the maximum number of candidate cells configured for measurements and reports across all configured LTM CSI reports for a current primary serving cell.

Clause 14. A apparatus comprising: means for determining that at least two channel state information (CSI) reports are to be reported; means for calculating priority values associated with the at least two CSI reports, at least one of the priority values calculated based on a determination that at least one of the at least two CSI reports is a lower-layered triggered mobility (LTM) CSI report; means for determining that a time occupancy of physical channels scheduled to carry the at least two CSI reports at least partially overlap on a carrier, the at least two CSI reports thereby said to collide; and means for sending one or more of the at least two CSI reports that are said to collide based on the priority values.

Clause 15. The apparatus of clause 14, wherein an LTM CSI report of the at least two CSI reports is associated with an LTM CSI reporting configuration, and wherein the priority value is associated with the LTM CSI report, and the priority value is calculated based on a serving cell index value for a serving cell at which the LTM CSI reporting configuration is configured.

Clause 16. The apparatus of clause 14 or clause 15, wherein the priority values include a priority value associated with the LTM CSI report, and the priority value is calculated based on a serving cell index value for a serving cell to which the LTM CSI report is to be reported.

Clause 17. The apparatus of any of clauses 14 to 16, wherein the priority values include a priority value associated with an LTM CSI report of the at least two LTM CSI reports, and the priority value is calculated based on a CSI priority formula including at least one of a serving cell index variable or a maximum number of serving cells variable set to a predefined value.

Clause 18. The apparatus of any of clauses 14 to 17, wherein an LTM CSI report of the at least two CSI reports is associated with an LTM CSI reporting configuration for reporting measurements for an one or more cells including one or more candidate cells configured for LTM, and wherein the priority values include a priority value associated with the LTM CSI report, and the priority value is calculated based on a candidate cell identifier for one of the one or more candidate cells.

Clause 19. The apparatus of clause 18, wherein the priority value associated with the LTM CSI report is calculated based on a lowest candidate cell identifier for the one or more candidate cells.

Clause 20. The apparatus of clause 19, wherein the priority value associated with the LTM CSI report is calculated based on the lowest candidate cell identifier for the one or more candidate cells that is not a current serving cell.

Clause 21. The apparatus of any of clauses 18 to 20, wherein the priority value associated with the LTM CSI report is calculated based on a lowest candidate cell identifier for which a measurement with valid measurement values is being reported in the LTM CSI report.

Clause 22. The apparatus of any of clauses 18 to 21, wherein the priority value associated with the LTM CSI report is calculated based on a lowest cell identifier for the one or more candidate cells for which at least one of at least one transmission configuration indicator (TCI) state has been activated, a timing advance (TA) has been acquired using user equipment (UE)-based TA measurement, or a physical downlink control channel (PDCCH) ordered physical random access channel (PRACH) transmission has been performed.

Clause 23. The apparatus of clause 22, wherein the priority value associated with the LTM CSI report is calculated based on the lowest cell identifier for which a measurement with valid measurement values is being reported, and for which at least one of at least one TCI state has been activated, a TA has been acquired using UE-based TA measurement, or a PDCCH ordered PRACH transmission has been performed.

Clause 24. The apparatus of any of clauses 14 to 23, wherein the priority values include a priority value associated with an LTM CSI report of the at least two CSI reports, and the priority value associated with the LTM CSI report is calculated based on a maximum number of candidate cells configured for LTM.

Clause 25. The apparatus of any of clauses 22 to 24, wherein the priority value associated with the LTM CSI report is calculated based on the maximum number of candidate cells configured for measurements and reports associated with the LTM CSI report.

Clause 26. The apparatus of any of clauses 22 to 25, wherein the priority value associated with the LTM CSI report is calculated based on the maximum number of candidate cells configured for measurements and reports across all configured LTM CSI reports for a current primary serving cell.

Clause 27. A method comprising: determining that at least two channel state information (CSI) reports are to be reported; calculating priority values associated with the at least two CSI reports, at least one of the priority values calculated based on a determination that at least one of the at least two CSI reports is a lower-layered triggered mobility (LTM) CSI report; determining that a time occupancy of physical channels scheduled to carry the at least two CSI reports at least partially overlap on a carrier, the at least two CSI reports thereby said to collide; and sending one or more of the at least two CSI reports that are said to collide based on the priority values.

Clause 28. The method of clause 27, wherein an LTM CSI report of the at least two CSI reports is associated with an LTM CSI reporting configuration, and wherein the priority value is associated with the LTM CSI report, and the priority value is calculated based on a serving cell index value for a serving cell at which the LTM CSI reporting configuration is configured.

Clause 29. The method of clause 27 or clause 28, wherein the priority values include a priority value associated with the LTM CSI report, and the priority value is calculated based on a serving cell index value for a serving cell to which the LTM CSI report is to be reported.

Clause 30. The method of any of clauses 27 to 29, wherein the priority values include a priority value associated with an LTM CSI report of the at least two LTM CSI reports, and the priority value is calculated based on a CSI priority formula including at least one of a serving cell index variable or a maximum number of serving cells variable set to a predefined value.

Clause 31. The method of any of clauses 27 to 30, wherein an LTM CSI report of the at least two CSI reports is associated with an LTM CSI reporting configuration for reporting measurements for a one or more cells including one or more candidate cells configured for LTM, and wherein the priority values include a priority value associated with the LTM CSI report, and the priority value is calculated based on a candidate cell identifier for one of the one or more candidate cells.

Clause 32. The method of clause 31, wherein the priority value associated with the LTM CSI report is calculated based on a lowest candidate cell identifier for the one or more candidate cells.

Clause 33. The method of clause 32, wherein the priority value associated with the LTM CSI report is calculated based on the lowest candidate cell identifier for the one or more candidate cells that is not a current serving cell.

Clause 34. The method of any of clauses 31 to 33, wherein the priority value associated with the LTM CSI report is calculated based on a lowest candidate cell identifier for which a measurement with valid measurement values is being reported in the LTM CSI report.

Clause 35. The method of any of clauses 31 to 34, wherein the priority value associated with the LTM CSI report is calculated based on a lowest cell identifier for the one or more candidate cells for which at least one of at least one transmission configuration indicator (TCI) state has been activated, a timing advance (TA) has been acquired using user equipment (UE)-based TA measurement, or a physical downlink control channel (PDCCH) ordered physical random access channel (PRACH) transmission has been performed.

Clause 36. The method of clause 35, wherein the priority value associated with the LTM CSI report is calculated based on the lowest cell identifier for which a measurement with valid measurement values is being reported, and for which at least one of at least one TCI state has been activated, a TA has been acquired using UE-based TA measurement, or a PDCCH ordered PRACH transmission has been performed.

Clause 37. The method of any of clauses 27 to 36, wherein the priority values include a priority value associated with an LTM CSI report of the at least two CSI reports, and the priority value associated with the LTM CSI report is calculated based on a maximum number of candidate cells configured for LTM.

Clause 38. The method of any of clauses 35 to 37, wherein the priority value associated with the LTM CSI report is calculated based on the maximum number of candidate cells configured for measurements and reports associated with the LTM CSI report.

Clause 39. The method of any of clauses 35 to 38, wherein the priority value associated with the LTM CSI report is calculated based on the maximum number of candidate cells configured for measurements and reports across all configured LTM CSI reports for a current primary serving cell.

Clause 40. A computer-readable storage medium that is non-transitory and has instructions stored therein that, in response to execution by at least one processing circuitry, causes an apparatus to at least: determine that at least two channel state information (CSI) reports are to be reported; calculate priority values associated with the at least two CSI reports, at least one of the priority values calculated based on a determination that at least one of the at least two CSI reports is a lower-layered triggered mobility (LTM) CSI report; determine that a time occupancy of physical channels scheduled to carry the at least two CSI reports at least partially overlap on a carrier, the at least two CSI reports thereby said to collide; and send one or more of the at least two CSI reports that are said to collide based on the priority values.

Clause 41. The computer-readable storage medium of clause 40, wherein an LTM CSI report of the at least two CSI reports is associated with an LTM CSI reporting configuration, and wherein the priority value is associated with the LTM CSI report, and the priority value is calculated based on a serving cell index value for a serving cell at which the LTM CSI reporting configuration is configured.

Clause 42. The computer-readable storage medium of clause 40 or clause 41, wherein the priority values include a priority value associated with the LTM CSI report, and the priority value is calculated based on a serving cell index value for a serving cell to which the LTM CSI report is to be reported.

Clause 43. The computer-readable storage medium of any of clauses 40 to 42, wherein the priority values include a priority value associated with an LTM CSI report of the at least two LTM CSI reports, and the priority value is calculated based on a CSI priority formula including at least one of a serving cell index variable or a maximum number of serving cells variable set to a predefined value.

Clause 44. The computer-readable storage medium of any of clauses 40 to 43, wherein an LTM CSI report of the at least two CSI reports is associated with an LTM CSI reporting configuration for reporting measurements for a one or more cells including one or more candidate cells configured for LTM, and wherein the priority values include a priority value associated with the LTM CSI report, and the priority value is calculated based on a candidate cell identifier for one of the one or more candidate cells.

Clause 45. The computer-readable storage medium of clause 44, wherein the priority value associated with the LTM CSI report is calculated based on a lowest candidate cell identifier for the one or more candidate cells.

Clause 46. The computer-readable storage medium of clause 45, wherein the priority value associated with the LTM CSI report is calculated based on the lowest candidate cell identifier for the one or more candidate cells that is not a current serving cell.

Clause 47. The computer-readable storage medium of any of clauses 44 to 46, wherein the priority value associated with the LTM CSI report is calculated based on a lowest candidate cell identifier for which a measurement with valid measurement values is being reported in the LTM CSI report.

Clause 48. The computer-readable storage medium of any of clauses 44 to 47, wherein the priority value associated with the LTM CSI report is calculated based on a lowest cell identifier for the one or more candidate cells for which at least one of at least one transmission configuration indicator (TCI) state has been activated, a timing advance (TA) has been acquired using user equipment (UE)-based TA measurement, or a physical downlink control channel (PDCCH) ordered physical random access channel (PRACH) transmission has been performed.

Clause 49. The computer-readable storage medium of clause 48, wherein the priority value associated with the LTM CSI report is calculated based on the lowest cell identifier for which a measurement with valid measurement values is being reported, and for which at least one of at least one TCI state has been activated, a TA has been acquired using UE-based TA measurement, or a PDCCH ordered PRACH transmission has been performed.

Clause 50. The computer-readable storage medium of any of clauses 40 to 49, wherein the priority values include a priority value associated with an LTM CSI report of the at least two CSI reports, and the priority value associated with the LTM CSI report is calculated based on a maximum number of candidate cells configured for LTM.

Clause 51. The computer-readable storage medium of any of clauses 48 to 50, wherein the priority value associated with the LTM CSI report is calculated based on the maximum number of candidate cells configured for measurements and reports associated with the LTM CSI report.

Clause 52. The computer-readable storage medium of any of clauses 48 to 51, wherein the priority value associated with the LTM CSI report is calculated based on the maximum number of candidate cells configured for measurements and reports across all configured LTM CSI reports for a current primary serving cell.

Clause 53. An apparatus comprising means for performing the method of any of clauses 27 to 39.

Clause 54. A computer-readable medium comprising computer-readable program code that, in response to execution by at least one processing circuitry, causes an apparatus to perform the method of any of clauses 27 to 39.

Clause 55. A computer-readable storage medium comprising computer-readable program code that, in response to execution by at least one processing circuitry, causes an apparatus to perform the method of any of clauses 27 to 39.

Clause 56. A computer program comprising computer-readable program code that, in response to execution by at least one processing circuitry, causes an apparatus to perform the method of any of clauses 27 to 39.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:
   at least one memory configured to store instructions; and
   at least one processing circuitry configured to access the at least one memory, and execute the instructions to cause the apparatus to at least:
   determine that at least two channel state information (CSI) reports are to be reported;
   calculate priority values associated with the at least two CSI reports, at least one of the priority values calculated based on a determination that at least one of the at least two CSI reports is a lower-layered triggered mobility (LTM) CSI report, the LTM CSI report being associated with an LTM CSI reporting configuration for reporting measurements for one or more candidate cells configured for LTM, the priority values including a priority value associated with the LTM CSI report, and the priority value being calculated based on a serving cell index value for a serving cell at which the LTM CSI reporting configuration is configured;
   determine that a time occupancy of physical channels scheduled to carry the at least two CSI reports at least partially overlap on a carrier, the at least two CSI reports thereby said to collide; and
   send one or more of the at least two CSI reports that are said to collide based on the priority values.

2. The apparatus of claim 1, wherein the priority values include a priority value associated with the LTM CSI report, and the priority value is calculated based on a serving cell index value for a serving cell to which the LTM CSI report is to be reported.

3. The apparatus of claim 1, wherein the priority value is calculated based on a CSI priority formula including at least one of a serving cell index variable or a maximum number of serving cells variable set to a predefined value.

4. The apparatus of claim 1,
   wherein the priority values include a priority value associated with the LTM CSI report, and the priority value is calculated based on a candidate cell identifier for one of the one or more candidate cells.

5. The apparatus of claim 4, wherein the priority value associated with the LTM CSI report is calculated based on a lowest candidate cell identifier for the one or more candidate cells.

6. The apparatus of claim 5, wherein the priority value associated with the LTM CSI report is calculated based on the lowest candidate cell identifier for the one or more candidate cells that is not a current serving cell.

7. The apparatus of claim 4, wherein the priority value associated with the LTM CSI report is calculated based on a lowest candidate cell identifier for which a measurement with valid measurement values is being reported in the LTM CSI report.

8. The apparatus of claim 4, wherein the priority value associated with the LTM CSI report is calculated based on a lowest cell identifier for the one or more candidate cells for which at least one of at least one transmission configuration indicator (TCI) state has been activated, a timing advance (TA) has been acquired using user equipment (UE)-based TA measurement, or a physical downlink control channel (PDCCH) ordered physical random access channel (PRACH) transmission has been performed.

9. The apparatus of claim 8, wherein the priority value associated with the LTM CSI report is calculated based on the lowest cell identifier for which a measurement with valid measurement values is being reported, and for which at least one of at least one TCI state has been activated, a TA has been acquired using UE-based TA measurement, or a PDCCH ordered PRACH transmission has been performed.

10. The apparatus of claim 8, wherein the priority value associated with the LTM CSI report is calculated based on the maximum number of candidate cells configured for measurements and reports associated with the LTM CSI report.

11. The apparatus of claim 8, wherein the priority value associated with the LTM CSI report is calculated based on the maximum number of candidate cells configured for measurements and reports across all configured LTM CSI reports for a current primary serving cell.

12. The apparatus of claim 1, wherein the priority value associated with the LTM CSI report is calculated based on a maximum number of candidate cells configured for LTM.

13. A method performed by a user equipment, the method comprising:
 determining that at least two channel state information (CSI) reports are to be reported;
 calculating priority values associated with the at least two CSI reports, at least one of the priority values calculated based on a determination that at least one of the at least two CSI reports is a lower-layered triggered mobility (LTM) CSI report, the LTM CSI report being associated with an LTM CSI reporting configuration for reporting measurements for one or more candidate cells configured for LTM, the priority values including a priority value associated with the LTM CSI report, and the priority value being calculated based on a serving cell index value for a serving cell at which the LTM CSI reporting configuration is configured;
 determining that a time occupancy of physical channels scheduled to carry the at least two CSI reports at least partially overlap on a carrier, the at least two CSI reports thereby said to collide; and
 sending one or more of the at least two CSI reports that are said to collide based on the priority values.

14. The method of claim 13, wherein the priority values include a priority value associated with the LTM CSI report, and the priority value is calculated based on a serving cell index value for a serving cell to which the LTM CSI report is to be reported.

15. The method of claim 13, the priority value is calculated based on a CSI priority formula including at least one of a serving cell index variable or a maximum number of serving cells variable set to a predefined value.

16. The method of claim 13,
 wherein the priority values include a priority value associated with the LTM CSI report, and the priority value is calculated based on a candidate cell identifier for one of the one or more candidate cells.

17. The method of claim 16, wherein the priority value associated with the LTM CSI report is calculated based on a lowest candidate cell identifier for the one or more candidate cells.

18. The method of claim 17, wherein the priority value associated with the LTM CSI report is calculated based on the lowest candidate cell identifier for the one or more candidate cells that is not a current serving cell.

19. The method of claim 16, wherein the priority value associated with the LTM CSI report is calculated based on a lowest candidate cell identifier for which a measurement with valid measurement values is being reported in the LTM CSI report.

20. The method of claim 16, wherein the priority value associated with the LTM CSI report is calculated based on a lowest cell identifier for the one or more candidate cells for which at least one of at least one transmission configuration indicator (TCI) state has been activated, a timing advance (TA) has been acquired using user equipment (UE)-based TA measurement, or a physical downlink control channel (PDCCH) ordered physical random access channel (PRACH) transmission has been performed.

21. The method of claim 20, wherein the priority value associated with the LTM CSI report is calculated based on the lowest cell identifier for which a measurement with valid measurement values is being reported, and for which at least one of at least one TCI state has been activated, a TA has been acquired using UE-based TA measurement, or a PDCCH ordered PRACH transmission has been performed.

22. The method of claim 20, wherein the priority value associated with the LTM CSI report is calculated based on the maximum number of candidate cells configured for measurements and reports associated with the LTM CSI report.

23. The method of claim 20, wherein the priority value associated with the LTM CSI report is calculated based on the maximum number of candidate cells configured for measurements and reports across all configured LTM CSI reports for a current primary serving cell.

24. The method of claim 13, wherein the priority value associated with the LTM CSI report is calculated based on a maximum number of candidate cells configured for LTM.

* * * * *